Aug. 4, 1936.  G. A. MARSHALL  2,049,713
GARDEN TOOL
Original Filed July 29, 1932
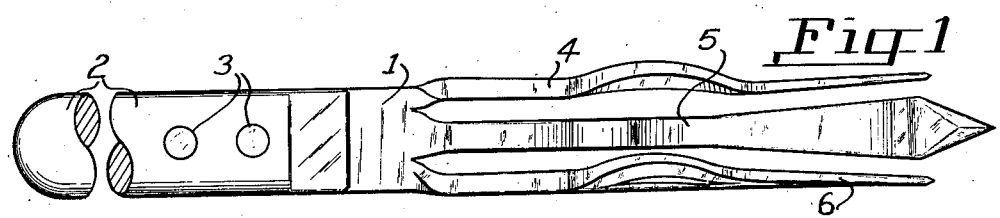
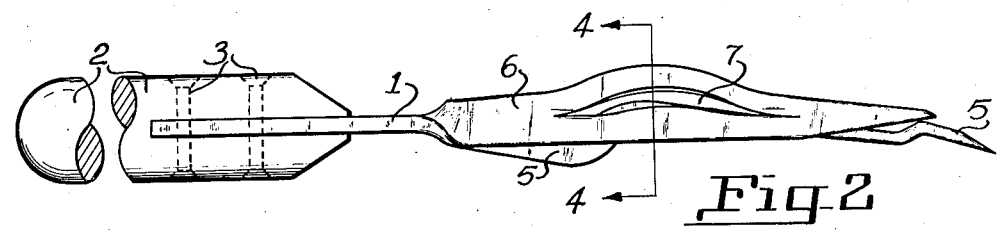
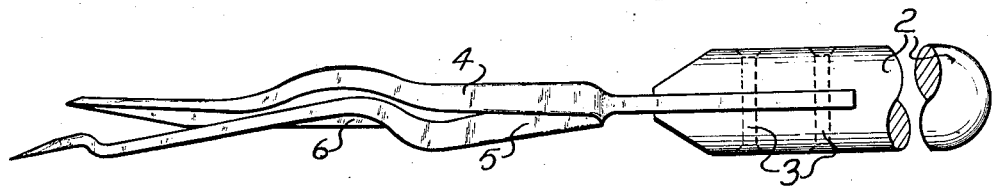
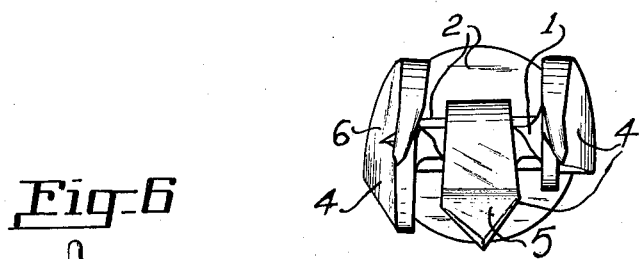
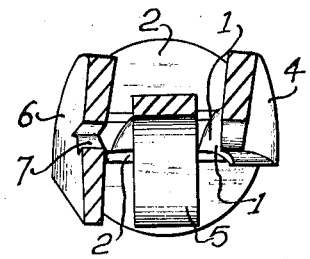
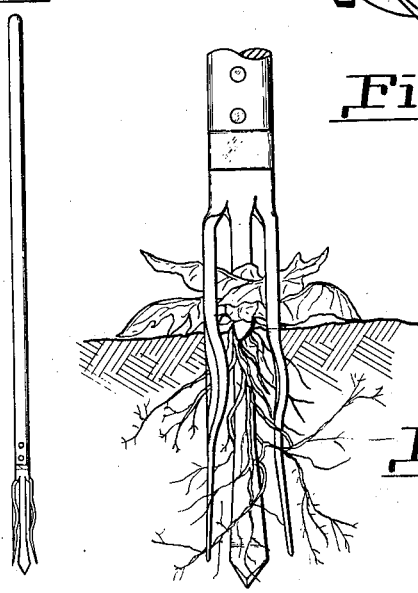
Inventor
George Albert Marshall
By
Attorney Patented Aug. 4, 1936

2,049,713

UNITED STATES PATENT OFFICE 2,049,713

GARDEN TOOL

George Albert Marshall, Portland, Oreg.

Refiled for abandoned application Serial No. 625,779, July 29, 1932. This application September 17, 1935, Serial No. 40,965

2 Claims. (Cl. 55—65)

This invention is directed to improvements in garden tools and more particularly to the type known as weed pullers.

This is a refile for abandoned application 625,779 filed July 29, 1932.

It has for its principal object to provide a tool of this character through the use of which objectionable weeds, roots, and the like may be effectively, conveniently and completely removed from the ground.

Another object of the invention is to provide a device of this character which is made up of a single piece of material which is of rugged construction and in which there are no moving parts.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a plan view of my improved form of tool.

Fig. 2 is an edgewise view of Fig. 1.

Fig. 3 is a side elevation of a modified form of the tool.

Fig. 4 is a slightly enlarged sectional, end view of Fig. 2, taken on line 4—4 of Fig. 2, looking in the direction indicated.

Fig. 5 is a full end view of Fig. 2.

Fig. 6 is a view of the assembled tool ready for use.

Fig. 7 is a view of the tool in operative engagement with the roots of a weed to be withdrawn from the ground.

Like reference characters refer to like parts throughout the several views.

Reference numeral number 1 indicates the main body of the tool proper, adapted for firm engagement with any suitable form of handle 2, by means of bolts, rivets, or the like as indicated at 3. The body 1 is elongated and formed into three prongs indicated at 4, 5 and 6. In the preferred form of the invention as shown in Figs. 1 and 2 the prongs 4 and 6 are disposed at right angles with respect to the prong 5. The prong 6 is divided for a portion of its length to enlarge its width and to form a gap 7, within its length, while the prong 4 is shaped as shown in Fig. 3.

In Fig. 3 is shown a fragmentary side view of the assembled tool. This view is made to better illustrate the shape and contour of the prongs 4 and 5.

The prongs 4 and 6 in both forms of the invention being formed at right angles with respect to the prong 5 and the main body 1, are substantially rigid but the prong 5 being a flat and reduced continuation of the main body 1 and somewhat yieldable so that upon thrusting the tool into the ground and into engagement with the weeds, or roots thereof, to be dealt with, a gripping action occurs around the root between the prongs 4 and 6 and the prong 5, when brought into engagement with the root. The soil around the root is also embraced within the grip of the tool so that upon rotating the tool approximately one-quarter turn in either a clockwise, or anti-clockwise direction the root will be wrenched loose from its natural engagement with the ground and be rendered free for easy removal by an upward withdrawal of the tool. The weed may also be removed by prying action in the downward movement of the handle in the usual manner.

While the form of mechanism herein shown and described is admirably adapted to fulfill the objects primarily stated, it is to be understood that it is not intended to confine the invention to the one form of embodiment herein shown and described, as it is susceptible of embodiment in various forms all coming within the scope of the claims which follow.

What I claim is:

1. A tool of the class described, comprising a main body member, a plurality of prongs formed integral with said main body member and extending outwardly therefrom, two of said prongs being substantially rigid with respect to the main body member and the other of said prongs being yieldingly formed with respect to said main body member, and curved outwardly with respect to said rigid prongs, one of said rigid prongs being enlarged and divided for a portion of its length, and all of said prongs adapted to yieldingly engage the objects dealt with.

2. A tool of the class described comprising a pair of prongs formed integral with said main body member, and extending outwardly therefrom in alignment therewith and adapted for yielding outward movement with respect to the direction of the length of the said main body member, another prong yieldingly formed integral with the main body member and disposed between the two first mentioned prongs and adapted for yielding movement in a plane at right angles to the others of said prongs, the outermost end of the said last mentioned prong being terminated at a point beyond and to one side of the terminals of the other of said prongs so that upon thrusting the entire tool into the ground to embrace a growth of vegetation therein, a gripping action will occur around the roots of said vegetation.

GEORGE ALBERT MARSHALL.